Aug. 12, 1958 C. A. OTTO 2,846,983
SINGLE ACTING MOTOR WITH PNEUMATIC RETURN SPRING
Filed April 14, 1955 2 Sheets-Sheet 1
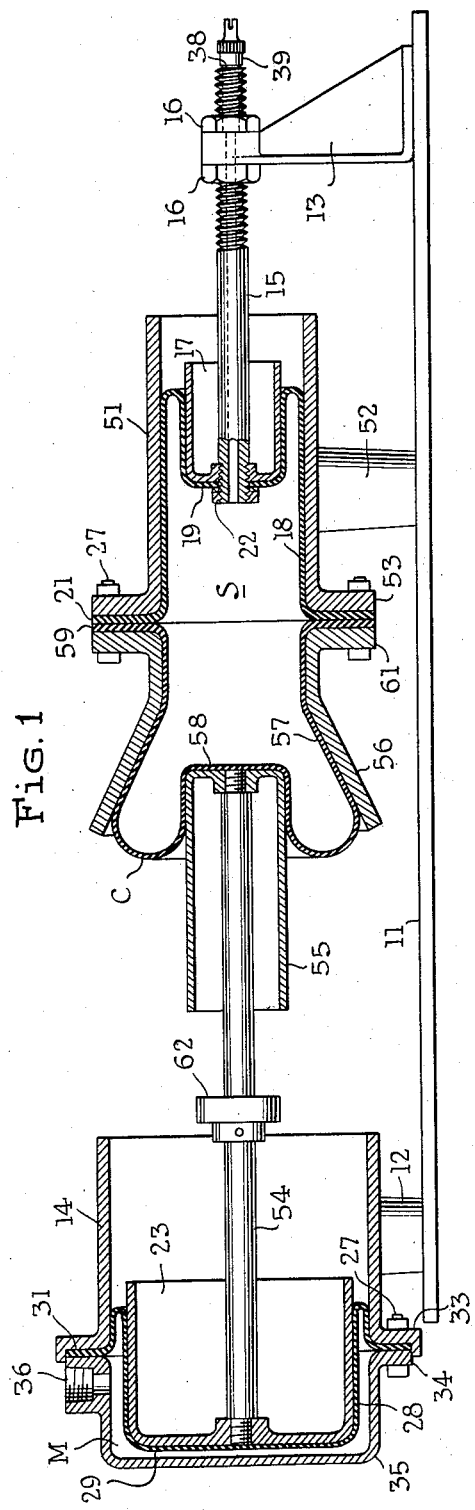
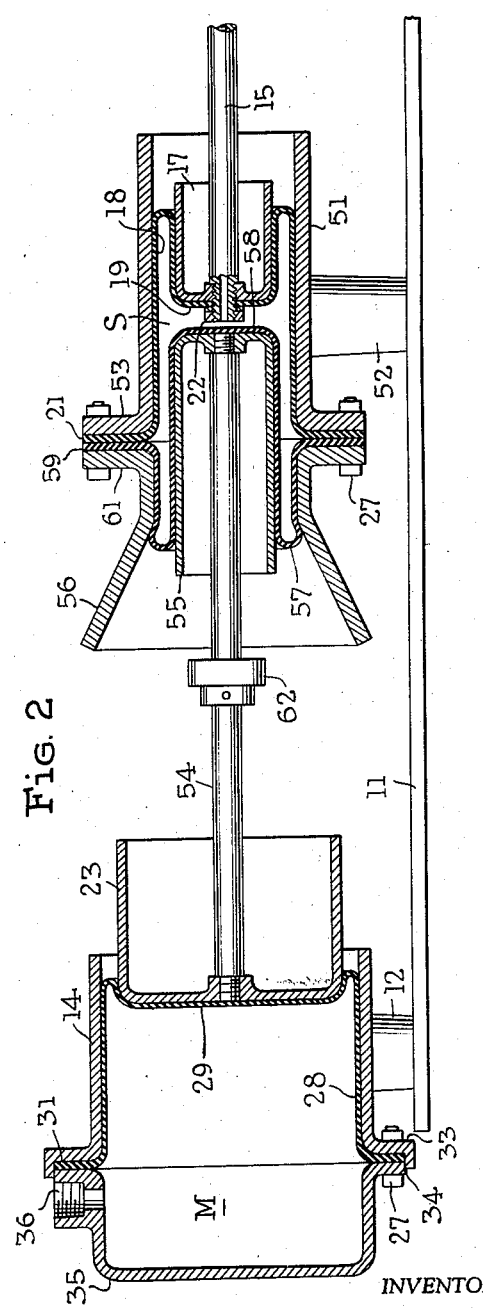
INVENTOR
Carl A. Otto
BY
ATTORNEYS

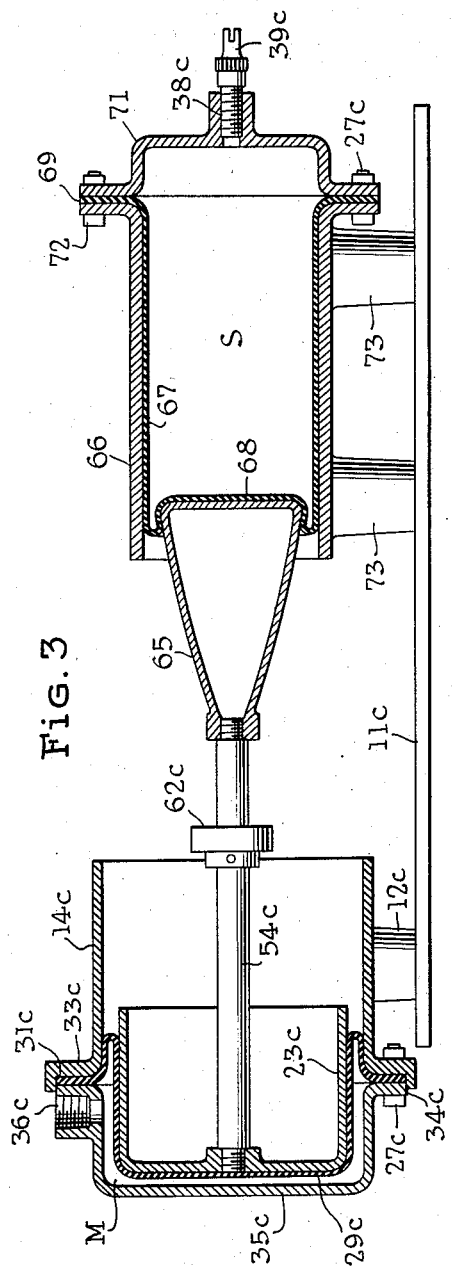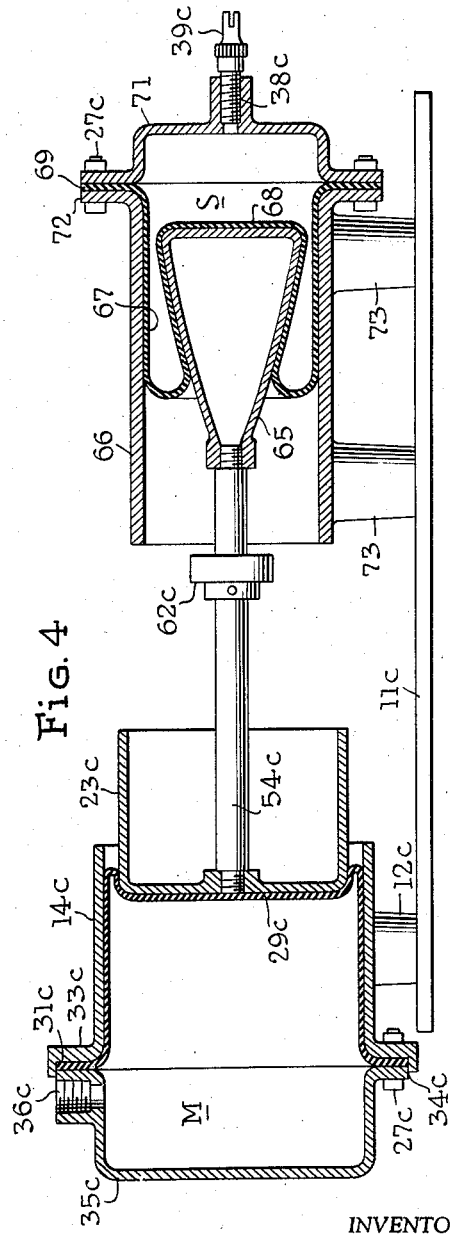

United States Patent Office 2,846,983
Patented Aug. 12, 1958

2,846,983
SINGLE ACTING MOTOR WITH PNEUMATIC RETURN SPRING

Carl A. Otto, Milwaukee, Wis., assignor to Johnson Service Company, Milwaukee, Wis., a corporation of Wisconsin Application April 14, 1955, Serial No. 501,251

3 Claims. (Cl. 121—48)

This invention relates to expansible chamber motors of the single acting type including a return spring.

The invention can be availed of in motors for various purposes but will be described as embodied in a damper motor intended for control by a gradual-acting pneumatic thermostat.

The standards in this service are exacting. The damper must respond accurately and progressively to changes of pressure; the space available is not large, and many such motors are rather inaccessible so that frequent servicing is impracticable.

The improved motor is comparatively free from friction, requires no lubrication, can be proportioned for long strokes, is virtually leak-proof and is simple and inexpensive to manufacture and install.

The most important feature of the invention is the use of a pneumatic spring. As dampers are increased in size, the motor must be capable of developing larger forces. Since the motors cannot conveniently be greatly increased in size the logical recourse is to higher operating pressures, but these present a new difficulty, in that powerful springs of conventional metal types and their connecting mechanisms are unwieldy and heavy and take much space, particularly if means are included to compensate for the variations of force reaction with displacement.

The invention affords a compact pneumatic spring of simple construction and low friction which can be designed to give various compensations affecting the force-motion characteristic. For example a straight-line characteristic is attainable. High pneumatic spring pressures are practicable and three means for modifying the force reaction can be used singly or in various combinations.

The first of the three means modifies the rate of volume change of the pneumatic spring in relation to motion of the motor. The second varies the clearance volume of the spring, or to state it differently, varies the ratio of total volume to the maximum variation of volume. The third varies the charge in the spring and thus varies the force reaction of the pneumatic spring when motion commences.

The first of the three means will ordinarily be controlled by design, but the second and third are adjustable, within reasonable limits, so that the performance of a given motor with pneumatic spring can be usefully modified.

Since the damper or other actuated device is not involved in the invention, and can take a wide variety of forms, only the motor and pneumatic spring will be illustrated.

The accompanying drawings are intended to illustrate principles, and show in simplified form various embodiments of the invention.

Figure 1 is a sectional view of the preferred embodiment of the invention, the plane of section passing through the longitudinal axis of the device. The apparatus is shown in one of its extreme positions.

Figure 2 is a sectional view of the apparatus shown in Figure 1, illustrating the device in its other extreme position.

Figures 3 and 4 are respectively views similar to Figures 1 and 2 but showing a modification.

Statements of direction refer to the device as shown in the figure or figures there under discussion.

Figures 1 and 2 show the basic elements of the concept. A base 11 carries three pedestals 12, 52 and 13. Pedestal 12 supports an open-ended cylinder 14 with its open end presented toward pedestal 13. Pedestal 13 carries a tubular rod 15 whose axis is coincident with the axis of cylinder 14. The rod 15 is adjustable toward and from cylinder 14. The adjustment is fixed by nuts 16 which engage threads on rod 15. A cup shaped cylindrical member 17 is fixed coaxially on the end of rod 15 with its closed end presented toward cylinder 14.

The member 17 supports a rolling seal comprising a cylindrical, flexible tube 18 with a flat end closure 19 at one end and a flange 21 at the other end. The material of the seal could be rubber, but certain rubber-like synthetic materials, such as those used for inner tubes for tires have longer life, are resistant to damage by heat and oils, are nearly completely impervious to air and gases, and hence are preferred. Since maximum flexibility is desired, cord or fabric reinforcements are avoided, at least in the tubular portion 18.

The seal member 18, 19, 21 fits over the member 17. The head of the member 17 and the part 19 of the seal have registering openings through which the extremity of rod 15 passes. Nuts 22 threaded on the rod 15 afford a rigid connection, and a tight seal.

A cylinder 51 whose inner and outer diameters are both intermediate, the inner diameter of cylinder 14 and outer diameter of member 17, surrounds the member 17 and includes an extension 57 which is shown as having a conical form. The cylinder 51 and its extension 57 have mating flanges. Between these flanges (which are connected by bolts 27) the flange 21 of the rolling seal is clamped. The tubular sleeve 18 is folded upon itself as shown, and the interval between members 17 and 51 is so dimensioned that member 51 is centered on member 17 by the fold, but rubbing contact is avoided.

A second rolling seal, of the same material as the one just described is mounted over the closed end of member 23. It includes a tubular portion 28 with end closure 29 and terminal flange 31. The flange 31 is clamped between a flange 33 on cylinder 14 and a flange 34 on a rigid head 35 which closes the outer end of the cylinder. The flanges are connected by bolts 27, as indicated.

A connection 36 for the actuating fluid pressure is shown. The pressure line connected at 36 would be (as a rule) the branch line of a controlling relay, thermostat or other pneumatic regulating device.

Piston 23 is connected by rod 54 with a cup-shaped plunger 55 smaller in diameter than the piston 23 and coaxial therewith.

A sort of rolling seal reacts between the plunger 55 and the flaring extension 56 and comprises a tubular, flexible member 57 with an end closure 58 seated on the closed end of plunger 55, and a marginal flange 59 which, together with the flange 21, is clamped between the flanges 53 and 61. The rod 54 is the moving element of the motor and the collar 62 affords a means for connecting an actuated device. Longitudinal adjustment of the rod 15 changes the clearance volume of spring chamber S, which may be initially charged through the valve assembly 38, 39. The relatively long radius fold C in the tubular member 57, in conjunction with the flaring extension 56, affords a peripheral extension of the effective area of plunger 55. The additional area so afforded decreases as the plunger moves to the right, in a relation which is determined by the flare of member 56.

Substitute members 56 may have greater or less flare and may be true cones or conoids, or as in the embodiment illustrated, the member 56 may be part cylindrical and part conoidal, as occasion for modified force reactions may dictate. Obviously it would be a simple matter to interchange flare members 56 so that one simple operation permits the production of a wide range of motors.

Assuming for simplicity that the temperature of the gas in the space S remains constant (as ordinarily it does) the reaction in space S would follow Boyle's law and the force reaction would not be linear. However, the larger the volume of space S is made, relatively to the change of volume of S the smaller will be the change in force reaction. For example, if S be infinite the change in force reaction would be zero. Hence the adjustment of clearance volume has a marked effect.

Change of charge in the pneumatic spring also modifies response, but this is chiefly useful to establish a chosen motor pressure at which motion shall start.

In Figures 3 and 4 the base and the motor portion are the same as in Figures 1 and 2. Hence the same numbers, with the letter "c," are applied, and no detailed description is needed.

The rod 54c carries a conoid plunger head 65 and this is moved axially by the motor through a cylindrical sleeve 66. There is an interposed rolling seal comprising a tube 67 with end closure 68 seated on the base of plunger head 65. At the other end of tube 67 is a flange 69 which is clamped between cap 71 and flange 72 at the end of sleeve 66. To change the volume of space S differently dimensioned caps 71 may be substituted. A charging valve 38c, 39c is provided. Sleeve 66 is sustained on base 11c by lugs 73.

Figures 3 and 4 are offered to indicate that the flare may be on either the fixed or the moving element of the pneumatic spring.

While it is believed to be of no present commercial importance, the fact is recognized that the spring space S could function as a motor and the motor space M as a pneumatic spring. For a specific example refer to Figures 1 and 2. The branch line could be connected to the bore of rod 15, and the charging valve could be attached at 36. This indicates that compensation can be applied to the motor rather than to the pneumatic spring.

Two examples have been illustrated to indicate the versatility of the concept. Other specifically different embodiments are possible. The structures have been simplified in the interest of brevity. The scope of the invention is defined solely by the claims.

What is claimed is:

1. A gas spring comprising in combination a cylinder element having one closed end; a plunger element extending coaxially through the open end of the cylinder element; and a rolling seal of the folded, flexible tube type closing the annular interval between the cylinder and plunger elements whereby a variable volume working space is provided, one of said coaxial elements including a coaxial conoidal portion in the region within which the rolling seal moves, said conoidal portion being arranged so that the effective area of the plunger element and seal decreases as the working volume decreases.

2. The combination defined in claim 1 in which the closed end comprises a movable abutment and means to adjust the position of the abutment.

3. The combination defined in claim 1 in which the conoidal portion is on the cylinder element.

References Cited in the file of this patent

UNITED STATES PATENTS

| 368,089 | Hinds | Aug. 9, 1887 |
| 2,452,176 | Bent | Oct. 26, 1948 |
| 2,731,534 | Hansen et al. | Jan. 17, 1956 |

FOREIGN PATENTS

| 136,458 | Switzerland | Jan. 16, 1930 |
| 485,617 | Great Britain | May 16, 1938 |